(12) United States Patent
Nakajima

(10) Patent No.: US 8,028,895 B2
(45) Date of Patent: Oct. 4, 2011

(54) ELECTRONIC MONEY CHARGER

(75) Inventor: Yasunari Nakajima, Gunma (JP)

(73) Assignee: Sanden Corporation, Isesaki-Shi, Gunma (JP)

( * ) Notice: Subject to any disclaimer, the term of this patent is extended or adjusted under 35 U.S.C. 154(b) by 868 days.

(21) Appl. No.: 12/051,263

(22) Filed: Mar. 19, 2008

(65) Prior Publication Data

US 2008/0302868 A1   Dec. 11, 2008

(30) Foreign Application Priority Data

Mar. 20, 2007   (JP) .................... 2007-071998

(51) Int. Cl.
- G06Q 40/00   (2006.01)
- G07D 11/00   (2006.01)
- G07F 19/00   (2006.01)

(52) U.S. Cl. ........ 235/379; 235/375; 235/380; 235/383; 705/39; 705/40; 705/41; 705/42; 705/43

(58) Field of Classification Search .................. 235/379, 235/380, 383; 705/39–45
See application file for complete search history.

(56) References Cited

U.S. PATENT DOCUMENTS

| | | |
|---|---|---|
| 4,975,680 A | 12/1990 | Fogle, Jr. |
| 5,854,581 A * | 12/1998 | Mori et al. .................. 235/379 |
| 2002/0118099 A1 * | 8/2002 | Oda et al. .................. 340/10.52 |
| 2003/0084119 A1 * | 5/2003 | Ichimura .................. 709/217 |
| 2004/0009778 A1 * | 1/2004 | Makuta .................. 455/456.1 |
| 2006/0118617 A1 * | 6/2006 | Matsumoto .................. 235/380 |

FOREIGN PATENT DOCUMENTS

| | | |
|---|---|---|
| DE | 4135767 | 5/1993 |
| DE | 20102477 | 5/2001 |
| EP | 0580297 | 1/1994 |
| EP | 1528513 | 5/2005 |
| GB | 2218081 | 11/1989 |
| JP | 2003-036466 | 2/2003 |

* cited by examiner

Primary Examiner — Thien M. Le
Assistant Examiner — Tuyen K Vo
(74) Attorney, Agent, or Firm — Banner & Witcoff, Ltd.

(57) ABSTRACT

The present invention provides an electronic money charger which can certainly prevent an electronic money from being fraudulently deposited. An electronic money charger of the present invention comprises a reader/writer which reads and writes data with respect to a contactless IC card in which an electronic money balance used in an electronic money service has been stored, a position information obtaining unit which obtains a latitude and a longitude representing a position of the electronic money charger, and a control unit which has control to perform an electronic money deposit process via the reader/writer, and control to disable the electronic money deposit process if the latitude and the longitude obtained by the position information obtaining unit after installation of the electronic money charger are different from the latitude and the longitude obtained at the time of the installation of the electronic money charger.

7 Claims, 7 Drawing Sheets

| HISTORY ID | USER ID | TRANSACTION DATE | DEPOSIT AMOUNT |
|---|---|---|---|
| 001 | 01010101 | 200y/mm/dd | ¥10,000 |
| 002 | 10101010 | 200y/mm/dd | ¥1,000 |
| 003 | 11112222 | 200y/mm/dd | ¥5,000 |
| 004 | 12341234 | 200y/mm/dd | ¥3,000 |
| ⋮ | ⋮ | ⋮ | ⋮ |

Fig. 5

| POSITION ID | LATITUDE | LONGITUDE | OBTAINING DATE |
|---|---|---|---|
| 001 | N35.69190 | E139.69922 | 200y/mm/dd |
| 002 | N35.69160 | E139.69880 | 200y/mm/dd |

Fig. 6

| CHARGER ID | LATITUDE | LONGITUDE | OBTAINING DATE |
|---|---|---|---|
| 001 | N35.69190 | E139.69922 | 200y/mm/dd |
| 002 | N35.65831 | E139.70172 | 200y/mm/dd |
| 003 | N35.68093 | E139.76699 | 200y/mm/dd |
| 004 | N34.70216 | E135.49503 | 200y/mm/dd |
| ⋮ | ⋮ | ⋮ | ⋮ |

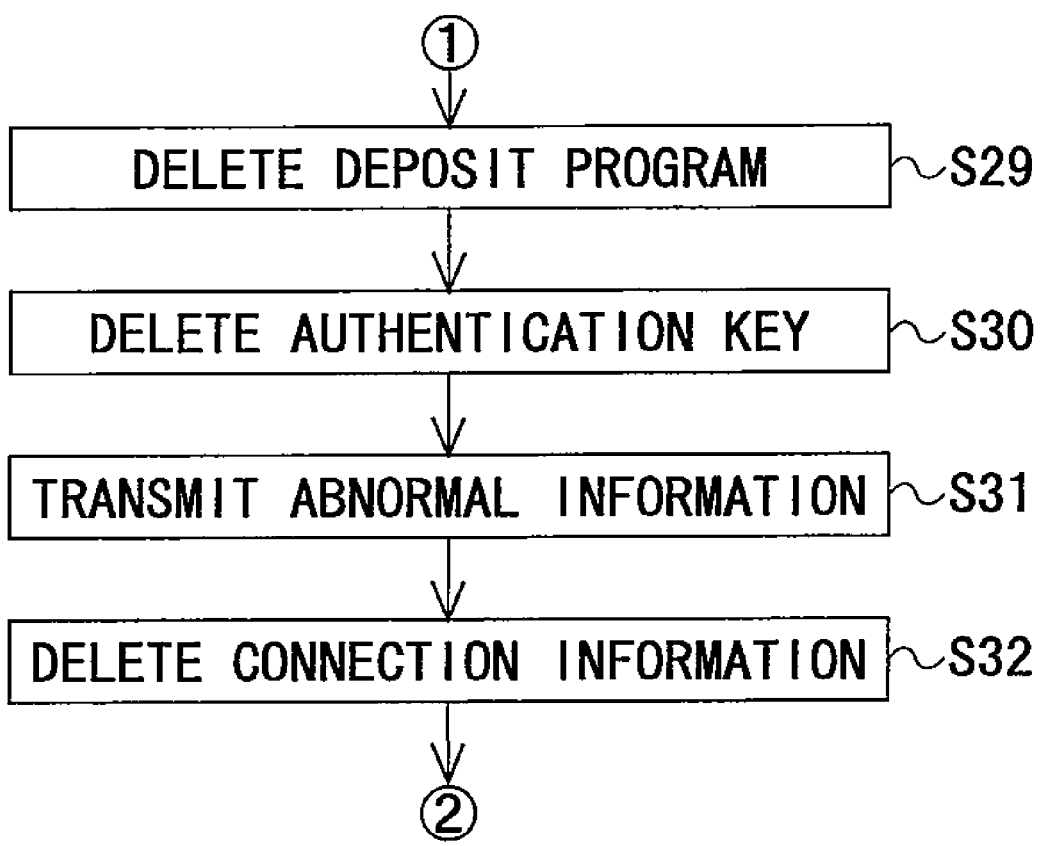

ELECTRONIC MONEY CHARGER

BACKGROUND OF THE INVENTION

1. Field of the Invention

The present invention relates to an electronic money charger which performs an electronic money deposit process with respect to a storage medium which stores an electronic money balance in an electronic money service used for, for example, an electronic ticket, electronic payment or the like.

2. Description of the Related Art

Conventionally, as this kind of electronic money charger, there has been known an electronic money charger which is provided with a reader/writer which reads and writes data with respect to a storage medium in which an electronic money balance used in an electronic money service has been stored, and which performs an electronic money deposit process by adding an amount of an inserted currency to the electronic money balance in the storage medium via the reader/writer (for example, see Japanese Patent Publication 2003-36466).

However, since this electronic money charger can perform the electronic money deposit process in itself, if the electronic money charger has been brought out to a place which is different from an installation place during normal operation, inserted banknotes received within the deposit apparatus may be removed, and in addition, it may be possible to fraudulently deposit an electronic money with respect to the storage medium.

Consequently, there has been known an electronic money charger which is provided with a communication device connectable to a predetermined management server via a network, and which establishes connection to the management server via the communication device by using predetermined connection information stored in the communication device, subsequently performs an authentication process with respect to the management server, and performs the electronic money deposit process only if the authentication process has been normally completed.

However, in this case, since the communication device is provided in the electronic money charger, it is possible to connect to the management server via the communication device even if the communication device has been brought out along with a main body of the electronic money charger. Therefore, if the authentication process with respect to the management server has been normally completed, the electronic money may be fraudulently deposited.

BRIEF SUMMARY OF THE INVENTION

The present invention has been made in view of the above described problems, and an object of the present invention is to provide an electronic money charger which can certainly prevent an electronic money from being fraudulently deposited.

To achieve the above described object, the electronic money charger of the present invention is provided with a reader/writer which reads and writes data with respect to a storage medium in which an electronic money balance used in an electronic money service has been stored, position information obtaining means which obtains position information representing a position of the electronic money charger, and control means which has control to perform an electronic money deposit process by adding an amount of an inserted currency to the electronic money balance in the storage medium via the reader/writer, and control to disable the above described deposit process if the position information obtained by the position information obtaining means after installation of the electronic money charger is different from the position information obtained at the time of the installation of the electronic money charger.

Thereby, if the position information obtained by the position information obtaining means after the installation is different from the position information obtained at the time of the installation, the electronic money deposit process is not performed. Consequently, for example, if the position of the electronic money charger obtained by the position information obtaining means at a predetermined timing after the installation and the position of the electronic money charger which has been previously obtained during normal operation are different from each other, the electronic money deposit process can be disabled. Therefore, in the present invention, it is possible to certainly prevent the electronic money from being fraudulently deposited after the electronic money charger has been brought out, and also possible to provide an electronic money service with very high security.

BRIEF DESCRIPTION OF SEVERAL VIEWS OF THE DRAWINGS

FIG. 5 is a diagram showing an example of a data structure of position information;

FIG. 6 is a diagram showing an example of a data structure of registration information; and FIGS. 7 to 9 are flowcharts showing operations of a control unit.

DETAILED DESCRIPTION OF THE INVENTION

Figure 1:
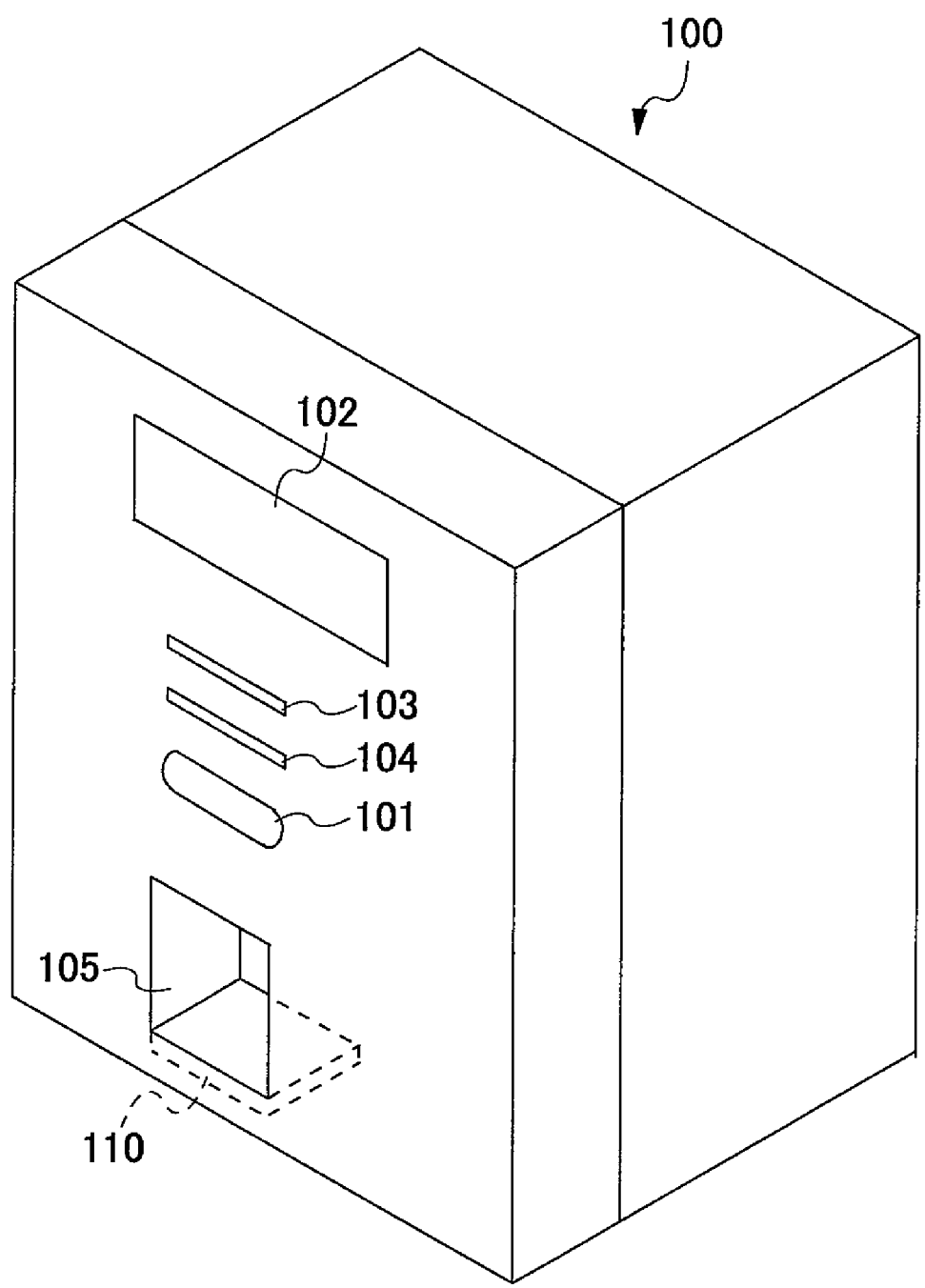
FIG. 1 is a perspective view of an electronic money charger showing an embodiment of the present invention.
Figure 2:
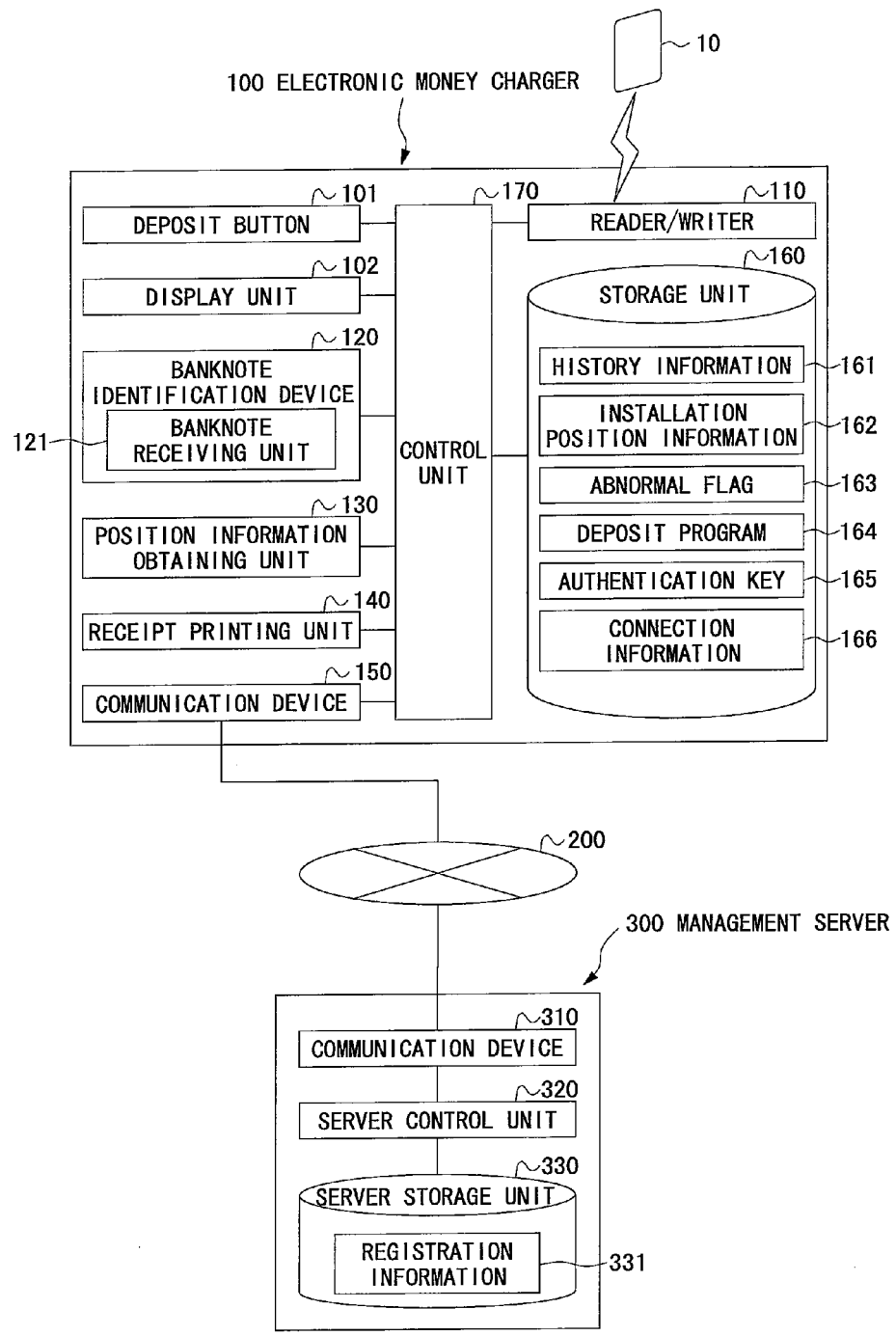
FIG. 2 is a functional configuration diagram of the electronic money charger.
Figures 3, 4:
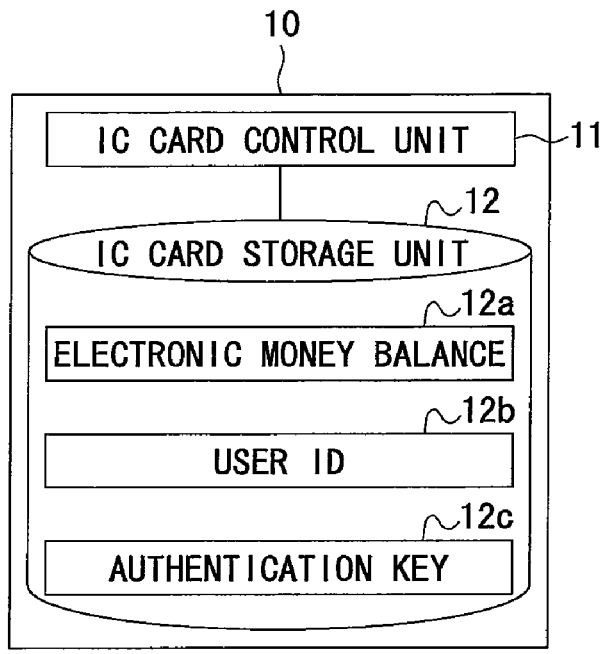
FIG. 3 is a functional configuration diagram of a contactless IC card.
FIG. 4 is a diagram showing an example of a data structure of history information.
Figure 7:
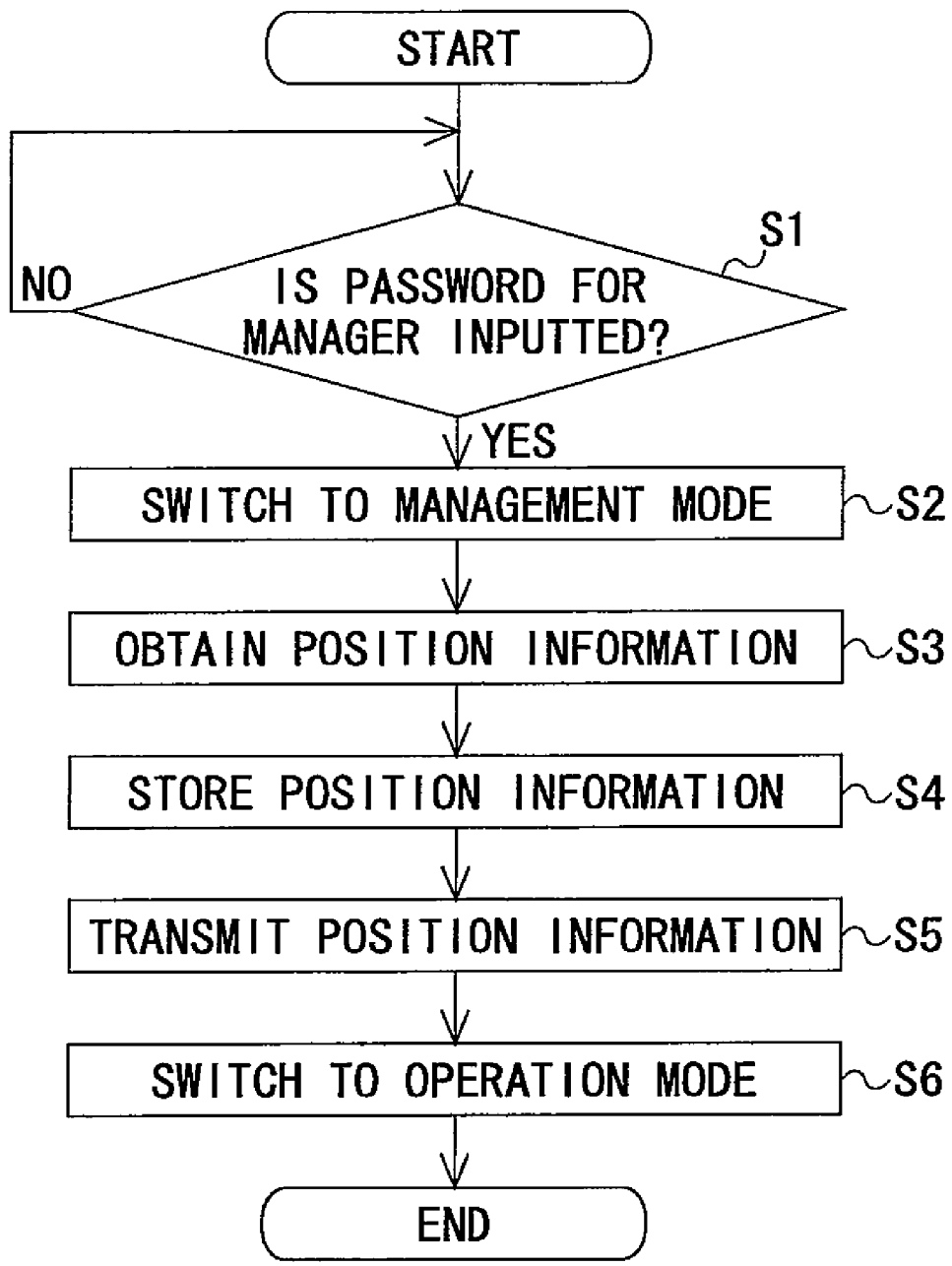
Figure 8:
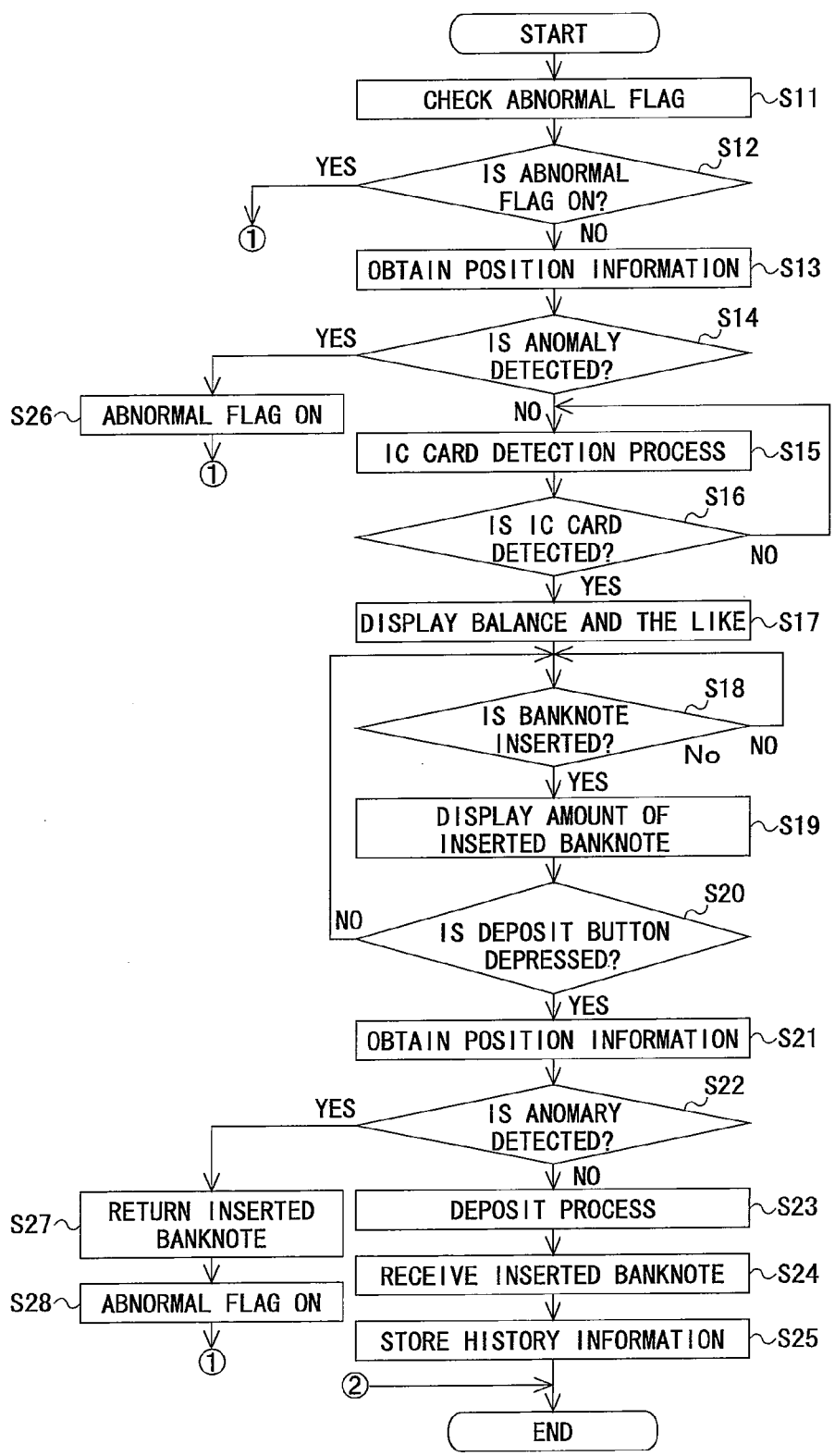

FIGS. 1 to 9 show an embodiment of the present invention, and FIG. 1 is a perspective view of an electronic money charger, FIG. 2 is a functional configuration diagram of the electronic money charger, FIG. 3 is a functional configuration diagram of a contactless IC card, FIG. 4 is a diagram showing an example of a data structure of history information, FIG. 5 is a diagram showing an example of a data structure of position information, FIG. 6 is a diagram showing an example of a data structure of registration information, and FIGS. 7 to 9 are flowcharts showing operations of a control unit.

An electronic money charger 100 of this embodiment performs an electronic money deposit process by adding an amount of an inserted banknote to an electronic money balance of a contactless IC card 10.

As shown in FIG. 1, the electronic money charger 100 is provided with a deposit button 101 for starting the electronic money deposit process, a display unit 102 for displaying information on the deposit process, a banknote insertion slot 103, a receipt ejection slot 104 for ejecting a receipt on which a result of the deposit process has been printed, and a card placement unit 105 in which its front side is open, at a front side thereof. Moreover, as shown in FIG. 2, within the electronic money charger 100, a reader/writer 110, a banknote identification device 120, a position information obtaining unit 130, a receipt printing unit 140, a communication device 150, a storage unit 160 and a control unit 170 are provided, and the above described respective devices are connected to the control unit 170. Furthermore, the electronic money charger 100 is connected to a management server 300 for an electronic money service via a network 200.

In the contactless IC card 10, a coil-shaped antenna (not shown) for transmitting and receiving signals with respect to the reader/writer 110 in a noncontact manner, and an IC chip connected to the antenna are buried. As shown in FIG. 3, in this IC chip, an IC card control unit 11 for controlling a circuit within the IC chip, and an IC card storage unit 12 for storing various information are provided.

The IC card control unit 11 is provided with a CPU and a memory such as a RAM or a ROM, and performs a process of updating or reading the various information stored in the IC card storage unit 12 in response to an IC card command received via the antenna from the reader/writer 110.

The IC card storage unit 12 is a rewritable storage element such as an EEPROM, and an electronic money balance 12a, a user ID 12b and an authentication key 12c have been stored therein. The user ID 12b is for identifying a user of the electronic money service, and different IDs have been granted to multiple contactless IC cards 10, respectively. The authentication key 12c is key information for accessing the electronic money balance 12a, and is configured to be usable in an authentication process based on a common key cryptography. The IC card control unit 11 performs the authentication process with respect to the electronic money charger 100 by using the authentication key 12c, and only if the authentication process has been normally completed, the IC card control unit 11 performs a process of updating or reading the electronic money balance 12a.

Next, the respective devices provided in the electronic money charger 100 will be described. The deposit button 101 is for instructing to perform the electronic money deposit process, and when the deposit button 101 is depressed, a predetermined deposit instruction signal is transmitted to the control unit 170.

The display unit 102 is display equipment such as a well-known liquid crystal display, and displays information received from the control unit 170.

The reader/writer 110 is provided underneath the card placement unit 105, and transmits and receives the IC card command and data with respect to the contactless IC card 10 placed on the card placement unit 105. In the reader/writer 110, an antenna (not shown) for transmitting and receiving the signals with respect to the contactless IC card 10 in the noncontact manner is provided, and the IC card command received from the control unit 170 is transmitted via the antenna to the contactless IC card 10 and also the data received via the antenna from the contactless IC card 10 is transmitted to the control unit 170.

The banknote identification device 120 is for identifying validity and a money kind of a banknote inserted into the banknote insertion slot 103, and when the banknote identification device 120 has determined that the inserted banknote is valid, the banknote identification device 120 transmits information representing the amount of the inserted banknote to the control unit 170. Moreover, in the banknote identification device 120, a banknote receiving unit 121 for receiving the inserted banknote is provided, and if the banknote identification device 120 has received a predetermined banknote receiving signal from the control unit 170, the banknote identification device 120 receives the inserted banknote in the banknote receiving unit 121. Furthermore, when the banknote identification device 120 receives a predetermined banknote returning signal from the control unit 170, the banknote identification device 120 returns the inserted banknote to the user by exposing a portion of the inserted banknote from the banknote insertion slot 103.

The position information obtaining unit 130 is a well-known GPS (Global Positioning System) receiving module, and when the position information obtaining unit 130 receives a predetermined control signal from the control unit 170, the position information obtaining unit 130 obtains a latitude and a longitude of a position where the electronic money charger 100 has been installed, and transmits the latitude and the longitude to the control unit 170.

The receipt printing unit 140 is a well-known printer for printing the result of the deposit process on a predetermined paper sheet, and prints the information received from the control unit 170 on the above described paper sheet and subsequently ejects this paper sheet as the receipt from the receipt ejection slot 104.

The communication device 150 is communication equipment for connecting to the network 200 using a wireless communication network, and performs communication with the management server 300 via the network 200.

The storage unit 160 is a rewritable storage element such as the EEPROM, and history information 161 as shown in FIG. 4, installation position information 162 as shown in FIG. 5, an abnormal flag 163, a deposit program 164, an authentication key 165 and connection information 166 have been stored therein.

The history information 161 consists of multiple history records, and each history record is configured with a history ID for representing a number of the history record, the user ID 12b of the contactless IC card 10, a transaction date and a deposit amount. Moreover, in the history information 161, one history record is additionally written each time the electronic money deposit process is normally completed.

The installation position information 162 consists of two position records, and each record is configured with a position ID for representing a number of the position record, the latitude and the longitude obtained by the position information obtaining unit 130, and an obtaining date. Moreover, in the position information 162, in a first position record, that is, in a position record granted with "001" as the position ID, the latitude and the longitude of the installation position of the electronic money charger 100 during normal operation are stored. In a second position record, that is, in a position record granted with "002" as the position ID, the latitude and the longitude of the installation position at an arbitrary time are stored. In this case, the second position record is updated each time the latitude and the longitude are obtained by the position information obtaining unit 130.

The abnormal flag 163 is a variable for representing a state of the installation position of the electronic money charger 100. If its value is "1", the abnormal flag 163 represents that the installation position of the electronic money charger 100 is abnormal, that is, the electronic money charger 100 has been brought out to a place which is different from the installation position during the normal operation. If its value is "0", the abnormal flag 163 represents that the installation position of the electronic money charger 100 is normal, that is, the electronic money charger 100 has been installed at a position which is almost the same as the installation position during the normal operation. It should be noted that "0" has been set to the abnormal flag 163 as an initial value.

The deposit program 164 is a program for performing the electronic money deposit process, and is executed by the control unit 170.

The authentication key 165 is used in the authentication process with respect to the contactless IC card 10, and is configured similarly to the authentication key 12c of the contactless IC card 10.

The connection information 166 is used for the communication between the electronic money charger and the management server 300, and is configured with charger identification information (a charger ID) required for connecting to the management server 300, an IP address of the management server 300 and the like.

The control unit 170 is for controlling the entire electronic money charger 100, and is provided with a timer circuit (not shown) for obtaining a date when the position information has been obtained or the deposit process has been performed, in addition to the CPU and the memory such as the RAM or the ROM. Moreover, the control unit 170 controls the above described respective devices based on the data and the program stored in its own memory. Multiple IC card commands and the like which will be described later have been stored in a non-rewritable area in the memory, which however is not limited thereto. These commands and the like may have been stored in the storage unit 160 and the control unit 170 may read each command from the storage unit 160 if necessary. Moreover, the control unit 170 is configured to operate in two modes, that is, a management mode for setting the installation position of the electronic money charger 100 during the normal operation and the like, and an operation mode for performing the electronic money deposit process and the like. The control unit 170 operates in the management mode when a password for a manager is inputted by using input means (not shown) such as a numeric keypad connected to the control unit 170. It should be noted that operations of the control unit 170 will be described in detail below.

The management server 300 is a server for managing the electronic money service, and is configured with a communication device 310 for connecting to the network 200, a server control unit 320 for controlling the entire management server 300, and a server storage unit 330 for storing various information.

The communication device 310 is communication equipment for connecting to the network 200 similarly to the communication device 150 in the electronic money charger 100, and performs the communication with the electronic money charger 100 via the network 200.

The server control unit 320 is provided with a CPU and a memory such as the RAM or the ROM, and stores information received from the electronic money charger 100 via the network 200 and the communication device 310, in the server storage unit 330.

The server storage unit 330 is a rewritable storage element such as the EEPROM, and registration information 331 as shown in FIG. 6 has been stored therein. The registration information 331 represents a list of multiple electronic money chargers 100 which are normally operating, and is configured with multiple deposit apparatus records, each of which consists of the charger ID, the latitude and the longitude, and the obtaining date, which have been transmitted from each of the electronic money chargers 100.

In the electronic money charger 100 which is configured as described above, the electronic money deposit process is performed by adding the amount of the banknote inserted into the banknote insertion slot 103 to the electronic money balance 12a of the contactless IC card 10. Moreover, the electronic money charger 100 controls to disable the electronic money deposit process if the latitude and the longitude of the position information obtained by the position information obtaining unit 130 after the installation of the electronic money charger 100 is different from the latitude and the longitude obtained at the time of the installation of the electronic money charger 100. Hereinafter, operations of the electronic money charger 100 will be described with reference to FIGS. 7 to 9.

First, an operation in the case of obtaining the latitude and the longitude of the installation position at the time of the installation of the electronic money charger 100 will be described with reference to the flowchart of FIG. 7.

First, after the manager has installed the electronic money charger 100 at a predetermined position, when the electronic money charger 100 is powered on, the control unit 170 starts the operation in the operation mode which will be described later. Here, if the manager uses the input means to input the password for the manager (step S1), the control unit 170 switches its operating mode to the management mode (step S2).

Next, the control unit 170 causes the position information obtaining unit 130 to obtain the position information (the latitude and the longitude), by transmitting the control signal to the position information obtaining unit 130 (step S3). Then, the control unit 170 stores the position information obtained by the position information obtaining unit 130 in the installation position information 162 in the storage unit 160 (step S4). In this case, the control unit 170 generates the first position record which consists of the position ID granted with "001" as its value, the latitude and the longitude obtained by the position information obtaining unit 130, and the obtaining date obtained from the timer circuit, and stores the first position record in the installation position information 162.

Next, the control unit 170 uses the connection information 166 to establish the connection with respect to the management server 300, and also transmits the first position record in the installation position information 162 to the management server 300 (step S5). In this case, when the server control unit 320 in the management server 300 receives the first position record from the electronic money charger 100, the server control unit 320 stores the charger ID of the connection information 166 used for establishing the connection with the electronic money charger 100, and the first position record, in the registration information 331 in the server storage unit 330.

Then, the control unit 170 switches its operating mode to the operation mode (step S6). In this way, the latitude and the longitude of the installation position of the electronic money charger 100 at the time of the installation are obtained.

Next, the operations of the electronic money charger 100 after the installation will be described with reference to the flowchart of FIG. 8.

First, when the electronic money charger 100 is powered on, the control unit 170 starts the operation in the operation mode. In this case, the control unit 170 checks whether or not the abnormal flag in the storage unit 160 has been set to ON, that is, "1" (step S11), and if the abnormal flag has been set to OFF, that is, "0", the control unit 170 causes the position information obtaining unit 130 to obtain the position information (the latitude and the longitude) on the installation position of the electronic money charger 100 (steps S12 and S13). Then, when the control unit 170 obtains the position information from the position information obtaining unit 130, the control unit 170 obtains a difference between the latitude of the obtained position information and the latitude of the first position record in the installation position information 162, as well as a difference between the longitude of the position information and the longitude of the first position record in the installation position information 162, respectively, and if at least one of these differences is equal to or more than a predetermined value (for example, 0.01 degree), the control unit 170 determines that it is abnormal, that is, the electronic money charger 100 has been carried away (step S14). Next, if it is determined to be normal at step S14, that is, if both of the above described differences are less than the predetermined value, the control unit 170 performs a detection process until the contactless IC card 10 is detected (steps S15 and S16). Specifically, the control unit 170 performs the detection process by transmitting the IC card command for obtaining a predetermined response signal from the contactless IC card 10, via the reader/writer 110, and also causing the display unit 102 to display a message for guiding the user to place the contactless IC card 10 on the card placement unit 105. On the other hand, when the user places the contactless IC card 10 on the card placement unit 105, the IC card control unit 11 in the contactless IC card 10 transmits the response signal with respect to the IC card command received from the reader/writer 110. The control unit 170 detects the contactless IC card 10 by receiving the response signal via the reader/writer 110 from the contactless IC card 10. It should be noted that, in this embodiment, a card ID (not shown) specific to the contactless IC card 10 is used as the response signal.

Next, the control unit 170 causes the display unit 102 to display the electronic money balance 12a of the contactless IC card 10 and a message for guiding the user to insert the banknote (step S17). Specifically, the control unit 170 first uses the authentication key 165 in the storage unit 160 to perform the authentication process with respect to the contactless IC card 10. On the other hand, the card control unit 11 uses the authentication key 12c in the card storage unit 12 to perform the authentication process. Then, after the authentication process has been normally performed, the control unit 170 transmits the IC card command for reading the electronic money balance 12a and the user ID 12b, via the reader/writer 110 to the contactless IC card 10. Moreover, when the IC card control unit 11 in the contactless IC card 10 receives the above described IC card command, the IC card control unit 11 transmits the electronic money balance 12a and the user ID 12b in the IC card storage unit 12 to the reader/writer 110. Then, the control unit 170 stores the respective information 12a and 12b received via the reader/writer 110 from the contactless IC card 10, in the RAM.

Then, when the user inserts the banknote into the banknote insertion slot 103 (step S18), the banknote identification device 120 identifies the validity and the money kind of the inserted banknote, and if the banknote identification device 120 determines the validity of the inserted banknote, the banknote identification device 120 transmits information representing the amount of the inserted banknote to the control unit 170. Then, the control unit 170 causes the display unit 102 to display the information received from the banknote identification device 120 (step S19). Moreover, the control unit 170 repeats the above described processes at steps S18 and S19 until the deposit button 101 is depressed. In this case, a total amount of the inserted banknotes is displayed on the display unit 102.

Then, when the deposit button 101 is depressed and thereby the control unit 170 receives the deposit instruction signal (step S20), the control unit 170 obtains the position information similarly to the above described step S13, and also, similarly to the above described step S14, obtains the difference between the latitude of the obtained position information and the latitude of the first position record in the installation position information 162, as well as the difference between the longitude of the position information and the longitude of the first position record in the installation position information 162, respectively, and determines whether or not an anomaly has occurred (steps S21 and S22). Next, if it is determined to be normal at step S22, the control unit 170 performs the electronic money deposit process with respect to the contactless IC card 10 by executing the deposit program 164 in the storage unit 160 (step S23).

Here, contents of the electronic money deposit process will be specifically described. The control unit 170 first transmits the IC card command for adding the total amount of the inserted banknotes to the electronic money balance 12a, via the reader/writer 110 to the contactless IC card 10. On the other hand, when the IC card control unit 11 receives the above described IC card command from the reader/writer 110, the IC card control unit 11 adds the total amount of the inserted banknotes included in the IC card command to the electronic money balance 12a, and subsequently transmits a predetermined addition completion signal to the reader/writer 110. Then, when the control unit 170 receives the addition completion signal via the reader/writer 110, the electronic money deposit process is normally completed. It should be noted that, while the electronic money deposit process is performed, the control unit 170 causes the display unit 102 to display a message for guiding the user not to remove the contactless IC card 10 from the card placement unit 105.

Next, the control unit 170 receives the inserted banknotes into the banknote receiving unit 121 by transmitting the banknote receiving signal to the banknote identification device 120 (step S24). At this time, the control unit 170 transmits the user ID 12b, the date obtained from the timer circuit (the transaction date), and the total amount of the inserted banknotes (the deposit amount) to the receipt printing unit 140, and also causes the receipt printing unit 140 to print the receipt on which this information has been described. Then, the control unit 170 generates the history record which consists of the history ID, the user ID 12b, the transaction date and the deposit amount, and additionally writes the history record to the history information 161 in the storage unit 160 (step S25). In this way, it is possible to deposit the electronic money with respect to the contactless IC card 10.

Next, an operation for controlling to disable the electronic money deposit process will be described with reference to the flowcharts of FIGS. 8 and 9. At the above described step S12, if the abnormal flag 163 has been set to ON, the control unit 170 performs processes at step S29 and subsequent steps which will be described later. Moreover, if the anomaly has been detected at the above described step S14, the control unit 170 sets the abnormal flag 163 to ON, that is, rewrites the value of the abnormal flag 163 to "1", and subsequently performs the processes at step S29 and the subsequent steps (step S26). Furthermore, if the anomaly has been detected at the above described step S22, the control unit 170 first transmits the banknote returning signal to the banknote identification device 120. When the banknote identification device 120 receives the banknote returning signal from the control unit 170, the banknote identification device 120 returns the inserted banknotes (step S27). In this case, a portion of the inserted banknote is exposed from the banknote insertion slot 103, which enables the user to remove the inserted banknotes from the banknote insertion slot 103. Next, the control unit 170 sets the abnormal flag 163 to ON similarly to step S26, and subsequently performs the processes at step S29 and the subsequent steps (step S28).

Next, a specific process for disabling the electronic money deposit process will be described. The control unit 170 first deletes the deposit program 164 in the storage unit 160 (step S29). In this case, the process at step S23 cannot be performed, which disables adding the amount with respect to the electronic money balance 12a of the contactless IC card 10 by using the electronic money charger 100.

Next, the control unit 170 deletes the authentication key 165 in the storage unit 160 (step S30). In this case, the control unit 170 cannot perform the authentication process with respect to the contactless IC card 10, which disables access with respect to the electronic money balance 12a of the contactless IC card 10.

Next, the control unit 170 uses the connection information 166 to establish the connection with respect to the management server 300, and also transmits abnormal information to the management server 300 (step S31). This abnormal information includes the second position record in the installation position information 162, and when the server control unit 320 in the management server 300 receives the abnormal information from the electronic money charger 100 via the communication device 310, the server control unit 320 deletes the deposit apparatus record corresponding to the charger ID used for establishing the connection with the electronic money charger 100, from the registration information 331. Moreover, the server control unit 320 stores the charger ID and the second position record included in the abnormal information, into the server storage unit 330. Thereby, if the electronic money charger 100 has been carried away, a current position of the electronic money charger 100 which has been carried away is stored in the server storage unit 330, and therefore it is possible to know the current position of the electronic money charger 100 which has been carried away, at the management server 300 side.

Then, the control unit 170 deletes the connection information 166 in the storage unit 160 (step S32). Thereby, the connection with respect to the management server 300 is disabled.

It should be noted that the control unit 170 transmits the history information 161 which has been stored at step S25, to the management server 300 at an arbitrary time, although a description thereof has been omitted in the above described flow. The server control unit 320 in the management server 300 stores the received history information 161 in the server storage unit 330.

In this way, according to the electronic money charger 100 of this embodiment, the position information obtaining unit 130 which obtains the latitude and the longitude representing the position of the electronic money charger 100, and the control unit 170 which controls to disable the electronic money deposit process if the latitude and the longitude obtained by the position information obtaining unit 130 after the installation of the electronic money charger 100 are different from the latitude and the longitude obtained at the time of the installation of the electronic money charger 100 are provided. Consequently, for example, if the position of the electronic money charger obtained by position information obtaining means at a predetermined timing after the installation and the position of the electronic money charger which has been previously obtained during the normal operation are different from each other, the electronic money deposit process can be disabled. Therefore, it is possible to certainly prevent the electronic money from being fraudulently deposited after a main body of the deposit apparatus has been brought out, and also possible to provide an electronic money service with very high security.

Moreover, the control unit 170 controls to disable the electronic money deposit process if at least one of the difference between the latitude obtained after the installation and the latitude obtained at the time of the installation (the latitude of the first position record in the installation position information 162), and the difference between the longitude obtained after the installation and the longitude obtained at the time of the installation (the longitude of the first position record in the installation position information 162) is equal to or more than the predetermined value (for example, 0.01 degree). Thereby, the installation position of the electronic money charger 100 can be freely changed within less than a distance corresponding to the above described predetermined value. Therefore, the electronic money charger 100 of this embodiment can improve convenience.

Furthermore, if the latitude and the longitude obtained after the installation and the latitude and the longitude obtained at the time of the installation are different from each other, the control unit 170 deletes the deposit program 164 for performing the electronic money deposit process. Thereby, it becomes impossible to add the amount with respect to the electronic money balance 12a of the contactless IC card 10 by using the electronic money charger 100. Therefore, the electronic money charger 100 of this embodiment can certainly prevent the electronic money from being fraudulently deposited.

Furthermore, if the latitude and the longitude obtained after the installation and the latitude and the longitude obtained at the time of the installation are different from each other, the control unit 170 deletes the authentication key 165 for accessing the electronic money balance 12a of the contactless IC card 10. Thereby, it becomes impossible to access the electronic money balance 12a. Therefore, the electronic money charger 100 of this embodiment can certainly prevent the electronic money from being fraudulently deposited by adding the amount to the electronic money balance 12a.

Moreover, if the latitude and the longitude obtained after the installation and the latitude and the longitude obtained at the time of the installation are different from each other, the control unit 170 transmits the predetermined abnormal information to the management server 300 connected thereto via the network 200, and thereby can notify the management server 300 that the electronic money charger 100 has been brought out. Therefore, it is possible to manage whether or not the electronic money charger 100 has been brought out, at the management server 300 side in a centralized manner.

Furthermore, since the control unit 170 transmits the abnormal information including at least the latitude and the longitude obtained after the installation, to the management server 300, for example, it is possible to know the current position of the electronic money charger 100 which has been brought out, at the management server 300 side. Therefore, the manager of the electronic money charger 100 or the like can promptly repossess the electronic money charger 100.

Furthermore, since the control unit 170 deletes the connection information 166 for connecting to the management server 300, it becomes impossible to connect to the management server 300. Here, for example, if the control unit 170 is configured to perform the electronic money deposit process after performing the predetermined authentication process with respect to the management server 300, it becomes impossible to perform the electronic money deposit process. Therefore, the electronic money charger 100 of this embodiment can certainly prevent the electronic money from being fraudulently deposited.

It should be noted that the above described embodiment is nothing more than a specific example of the present invention and the present invention is not limited only to the above described embodiment. For example, although the above described embodiment has shown that the contactless IC card 10 is used as a storage medium, in addition, a mobile phone mounted with an RFID (Radio Frequency Identification) tag or an IC chip, or the like may be used as the storage medium.

Moreover, although the above described embodiment has shown that the position information is obtained at the time of the power on and the time of the deposit process instruction, it may be configured to cause the position information obtaining unit 130 to obtain the position information for every predetermined time (for example, one hour).

Furthermore, although the above described embodiment has shown that the position information at the time of the installation is obtained by the position information obtaining unit 130, it may be configured so that the position information at the time of the installation can be manually set.

Furthermore, although the above described embodiment has shown that only the banknotes are used as inserted currencies, of course it is also possible to use coins.

The invention claimed is:

1. An electronic money charger, comprising:
    a reader/writer which reads and writes data with respect to a storage medium in which an electronic money balance used in an electronic money service has been stored;
    position information obtaining means which obtains position information representing a position of the electronic money charger; and
    control means which has control to perform an electronic money deposit process by adding an amount of an inserted currency to the electronic money balance in the storage medium via the reader/writer, and control to disable said deposit process if the position information obtained by the position information obtaining means after installation of the electronic money charger is different from the position information obtained at the time of the installation of the electronic money charger.

2. The electronic money charger according to claim 1, wherein:
    said control means disables said deposit process if a difference between positions corresponding to each of said position information after the installation and said position information at the time of the installation is equal to or more than a predetermined distance.

3. The electronic money charger according to claim 1, wherein:
    said control means deletes a program for performing the electronic money deposit process, if said position information after the installation and said position information at the time of the installation are different from each other.

4. The electronic money charger according to claim 1, wherein:
    said control means deletes access information for accessing the electronic money balance in the storage medium, if said position information after the installation and said position information at the time of the installation are different from each other.

5. The electronic money charger according to claim 1, wherein:
    said control means transmits predetermined abnormal information to a predetermined management server connected thereto via a network if said position information after the installation and said position information at the time of the installation are different from each other.

6. The electronic money charger according to claim 5, wherein:
    said control means transmits the abnormal information including at least said position information after the installation to said management server.

7. The electronic money charger according to claim 1, wherein:
    said control means deletes connection information for connecting to a predetermined management server connected thereto via a network.

\* \* \* \* \*